Jan. 2, 1951  B. F. HOLEMAN  2,536,936
SAUCER
Filed Feb. 16, 1949

Inventor
Benjamin F. Holeman

By Clarence A. O'Brien
and Harvey B. Jacobson
Attorneys

Patented Jan. 2, 1951

2,536,936

UNITED STATES PATENT OFFICE 2,536,936

SAUCER

Benjamin F. Holeman, Washington, D. C.

Application February 16, 1949, Serial No. 76,704

1 Claim. (Cl. 65—15)

This invention relates to a saucer for use with a cup, and the saucer has features which are defined in terms of a cup wherewith the saucer is to be used.

A primary object of this invention is to provide a saucer which will allow the drainage of a beverage liquid from the base of the cup, so that the base of the cup will remain relatively dry even if a certain amount of the beverage liquid has been spilled into the saucer.

Another important object of this invention is to provide a saucer which, when used with a cup of suitable dimension, is not easily tipped over.

Still another object of this invention is to provide means for defining a reservoir for spilled beverage liquid in a saucer, of a character improved over means proposed heretofore for the same purpose.

And a last object to be mentioned specifically is to provide a saucer which is relatively inexpensive and practicable to manufacture, which is easy to clean, and which will give generally efficient and durable service.

Figure 1:
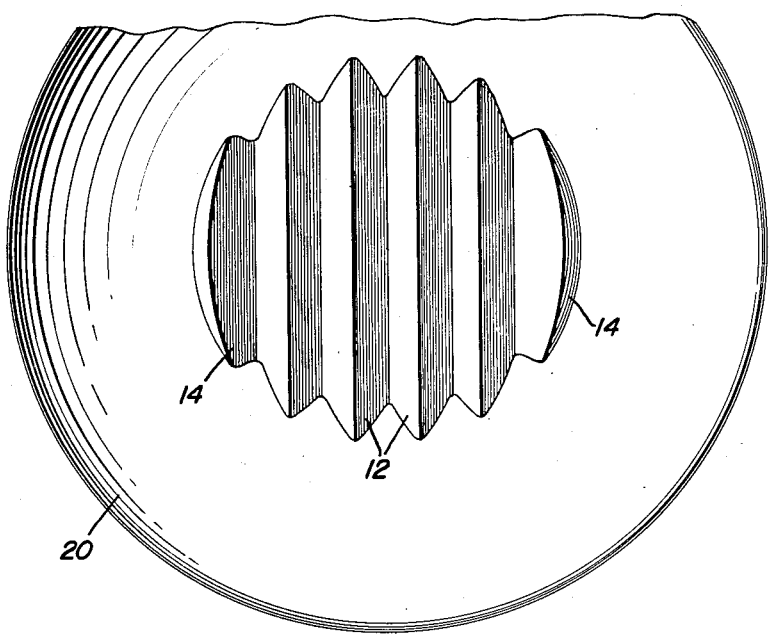
Figure 2:
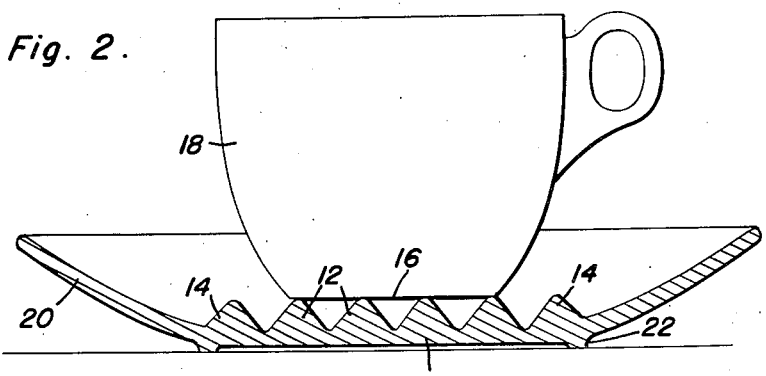
Figure 3:
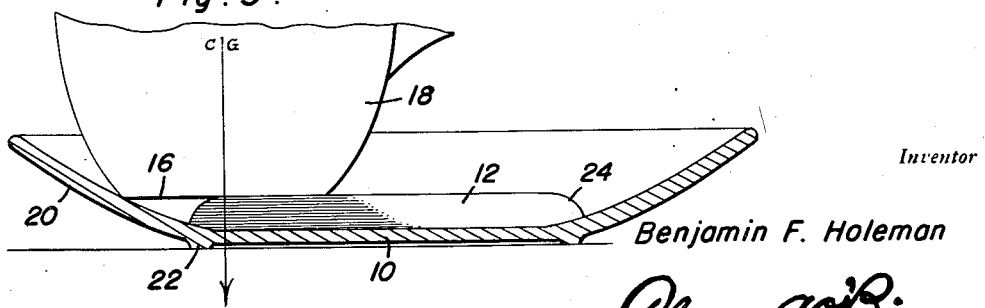

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 1 is a fragmentary top plan view of a saucer constructed according to this invention;

Figure 2 is a vertical transverse sectional view of the saucer, with a cup shown in elevation and operatively positioned on the saucer; and, Figure 3 is another view, similar to Figure 2 but showing the saucer as turned through 90 degrees about a vertical axis and the saucer is shown fragmentarily in a position indicating how a cup of a size and character suitable for use with this invention will ordinarily be prevented from tipping.

Similar characters of reference designate similar or identical elements or portions throughout the specification and throughout the different views in the drawing.

Referring now to the drawing in detail, this invention includes a saucer having a central portion 10 which may be circular and which has a plurality of straight parallel upstanding ribs 12 integral therewith and on the upper surface of the central portion. It is preferred that the outermost of the ribs 12 will be curved slightly, as indicated at 14, and that the ends of all the ribs 12 and 14 will be substantially positioned in a circle corresponding generally with the perimeter of the central portion 10, and the tops of the ribs 12 and 14 will be in a single plane. This plane will be horizontal when the saucer is being used in the ordinary manner and the bottom 16 of the cup 18 will rest upon the tops of the upstanding ribs 12 and 14. As indicated in Figure 3, the said plane when projected will intersect a rim 20 of the saucer, at the point where the bottom of the cup touches this rim when the cup is moved laterally on the saucer into contact with the rim 20. The saucer has an integral base of a diameter substantially equal to the length of the longest upstanding ribs 12, and in the drawings it is represented as comprised of an angular depending rib, identified by the numeral 22.

It should be carefully noted that the saucer herein described is designed particularly for use with a cup having a bottom 16 of a radius greater than the horizontal spacing of the depending rib 22 from the point of intersection of the bottom 16 with the rim 20 of the saucer. In other words, the point of intersection of the plane through the tops of the upstanding ribs 12 and 14 with the rim 20, and the corresponding portion of the base 22 of the saucer, are both on one side of a vertical line drawn through the center of gravity of the cup 18, as indicated in Figure 3, thus materially increasing the stability of the cup within the saucer. Still otherwise stated, the circle through the ends of the ribs 12 and 14 is substantially coaxially arranged with the depending rib 22.

It should also be carefully noted that the ends of the ribs are sharply curved downwardly as indicated at 24 in Figure 3, so that beverage liquid can flow from the space between one pair of upstanding ribs to the space between an adjacent pair of upstanding ribs.

The operation of this invention will be freely understood from a consideration of the foregoing description of the mechanical details thereof, taken in connection with the above recitation of the objects of this invention. It will be clear that all the mentioned objects are amply achieved by this invention and further description would appear unnecessary.

Minor variation from the embodiment represented in the drawing may be resorted to without departure from the spirit of this invention. For example, the base 22 need not be annular, and the ends of the upstanding ribs 12 and 14 may be arranged in a non-circular form, to correspond with differently shaped bases 22. Accordingly, limitation of this invention should be only as dictated by a proper interpretation of the terminology used in the subjoined claim.

Having described the invention, what is claimed as new is:

A saucer comprising a central portion having substantially straight parallel upstanding ribs, an integral upwardly concave rim, and an integral base, said base comprising a depending annular rib, the ends of said upstanding ribs being in a circle substantially coaxial and of equal diameter with said annular rib, the tops of said upstanding ribs being in a plane, said plane intersecting said rim on a line horizontally removed from said depending rib a distance less than the radius of the base of a cup suitable for use with said saucer.

BENJAMIN F. HOLEMAN.

REFERENCES CITED

The following references are of record in the file of this patent:

UNITED STATES PATENTS

| Number | Name | Date |
| --- | --- | --- |
| D. 55,238 | Berwick | May 25, 1920 |
| D. 75,310 | Webber | May 22, 1928 |
| 469,490 | Steers | Feb. 23, 1892 |
| 1,002,509 | Fitz | Sept. 5, 1911 |
| 1,038,647 | Pitt | Sept. 17, 1912 |
| 1,862,533 | Fish, Jr. | June 14, 1932 |
| 2,100,192 | Leindorf | Nov. 23, 1937 |
| 2,427,487 | Alexander | Sept. 16, 1947 |

FOREIGN PATENTS

| Number | Country | Date |
| --- | --- | --- |
| 23,024 | Great Britain | Oct. 16, 1896 |
| 26,447 | Great Britain | Dec. 1, 1902 |
| 217,689 | Great Britain | June 26, 1924 |